United States Patent [19]

Herrschaft

[11] Patent Number: 4,810,324

[45] Date of Patent: Mar. 7, 1989

[54] MULTIPLE CARTRIDGE LABEL APPLYING APPARATUS

[76] Inventor: William Herrschaft, 215 Roanoke Ave., Riverhead, N.Y. 11901

[21] Appl. No.: 201,942

[22] Filed: Jun. 3, 1988

[51] Int. Cl.[4] .......................... B32B 31/00; B44C 1/16

[52] U.S. Cl. .................................... 156/540; 156/580; 156/DIG. 9; 269/43; 269/287; 269/900

[58] Field of Search ............... 156/361, 381, 391, 423, 156/475, 512, 539, 540, 541, 580, DIG. 9, DIG. 10, DIG. 37; 269/1, 2, 37, 43, 287, 288, 900

[56] References Cited

U.S. PATENT DOCUMENTS

| | | | |
|---|---|---|---|
| Re. 24,516 | 8/1958 | Brownlee | 156/541 |
| 10,404 | 1/1854 | Filmore | 269/287 |
| 2,890,610 | 6/1959 | Lipnicki | 269/287 |
| 4,263,766 | 4/1981 | Baker et al. | 156/361 |
| 4,526,129 | 6/1985 | Braden | 269/900 |
| 4,655,164 | 4/1987 | Nelson et al. | 269/900 |
| 4,670,084 | 6/1987 | Durand | 156/540 |

*Primary Examiner*—Michael W. Ball
*Assistant Examiner*—Louis Falasco
*Attorney, Agent, or Firm*—Nicholas J. Garofalo

[57] ABSTRACT

Apparatus for applying a label to the back of each of a number of computer cartridges seated in a container, including a slotted label stripping plate hinged to the container pivotable to position a separate slot over each cartridge, a sheet of labels to be seated on the stripping plate with a separate label over each slot, a manipulative plate for pressing the seated cartridges against loose movement, and a pressure mask plate hinged to the container adapted to be pivoted to press the labels through the slots onto the backs of the cartridges.

11 Claims, 3 Drawing Sheets

FIG. 8
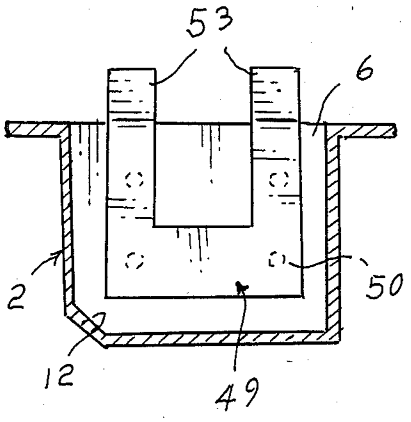
FIG. 7
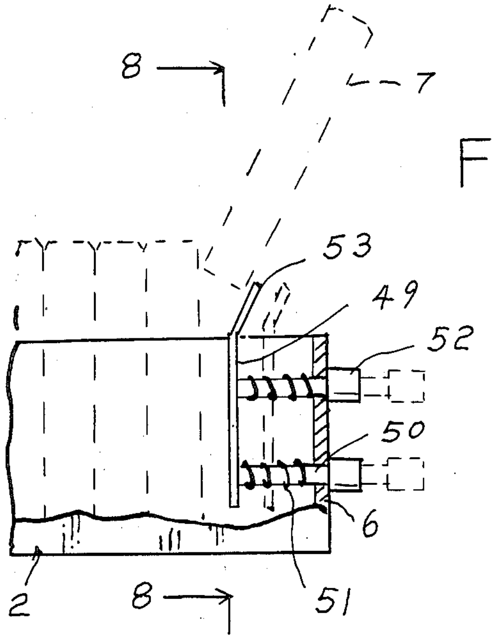
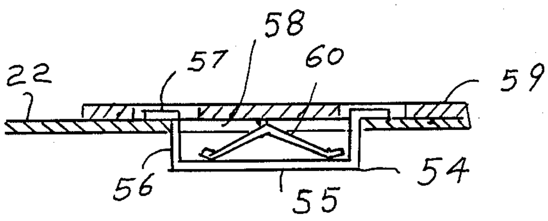
FIG. 10
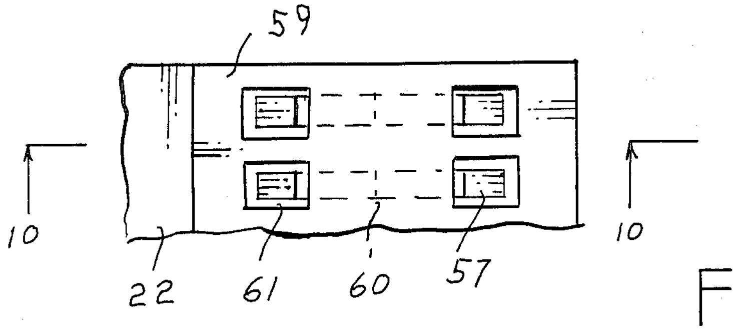
FIG. 9

MULTIPLE CARTRIDGE LABEL APPLYING APPARATUS

BACKGROUND OF THE INVENTION

This invention is directed to apparatus for applying labels to the indented edges of computer cartridges as a means for indexing and identifying their contents. More particularly, it is directed to practical means for efficiently applying such labels simultaneously to the indented label areas of a multiple number of cartridges.

As various categories of known information are gathered and taped and as new information is continually being accumulated and taped, an infinite number of computer cartridges containing this information issues daily and must be labeled.

So as to orderly shelve and readily identify the cartridges as to their contents for ready sale and use, a suitable label is placed on the indented label area of the back of each cartridge. Considering the vast number of cartridges issuing daily, the task of labeling them one by one is a slow, time consuming costly process.

A more expeditious and practical method of labeling the cartridges is needed. Accordingly, a general object of this invention is to provide adequate means to satisfy that need. It is an object of this invention to provide an efficiently operable and simple apparatus whereby a multiple number of cartridges may be simultaneously labeled in a practical and quick manner with suitable indicia for readily classifying the cartridges and identifying their contents.

The invention further lies in the particular construction and arrangement of its various components, and also in their cooperative association with one another to effect the objectives and results intended herein.

BRIEF SUMMARY OF THE INVENTION

The invention provides an apparatus having a container designed to have a multiple number of unlabeled cartridges seated therein for labeling. A spring loaded cartridge pressuring unit attached to the container is provided to remove any looseness between the seated cartridges so as to enable a simultaneous uniformed application of labels to the backs of the several cartridges. In effecting labeling of the cartridges, a label stripping mask plate hinged to one side of the container is adapted to be manually seated upon the backs of the several cartridges so as to register a group of slots in the plate with the backs of the cartridges. A sheet containing labels in the form of parallel columns of index characters is adapted to be accurately positioned upon the seated plate in such manner that each column overlies a separate one of the slots. A pressure mask plate is hinged to an opposite side of the container. It is adapted under manual pressure to be turned upon the sheet and cause a group of pads complementing the slots of the stripping mask plate to press the several columns of index characters from the sheet and through the slots onto the backs of the underlying cartridges. An adhesive on the undersurface of the several columns of index characters causes them to adhere to the backs of the cartridges. The cartridge pressuring unit is then manually actuated to relax its pressure on the cartridges to facilitate their removal from the container and their replacement with another group of cartridges for labeling.

The invention, together with its various features and advantages will become increasingly apparent as this specification unfolds in greater detail and as it is read in conjunction with the accompanying drawing wherein a preferred and specific embodiment of the invention is illustrated. However, it is to be expressly understood that the drawing is for purposes of illustration and description and it is not to be construed as limiting the scope of the invention.

BRIEF DESCRIPTION OF THE DRAWINGS

In the accompanying drawing:

FIG. 7 is a fragmentary view showing a modified form of the cartridge pressuring unit;

FIG. 8 is a section on line 8—8 of FIG. 7;

FIG. 9 is a fragmentary view of the pressure mask plate provided with a modified form of the pads for pressing the index columns from the sheet of labels; and FIG. 10 is a section on line 10—10 of FIG. 9.

DETAILED DESCRIPTION OF THE INVENTION

Figure 1:
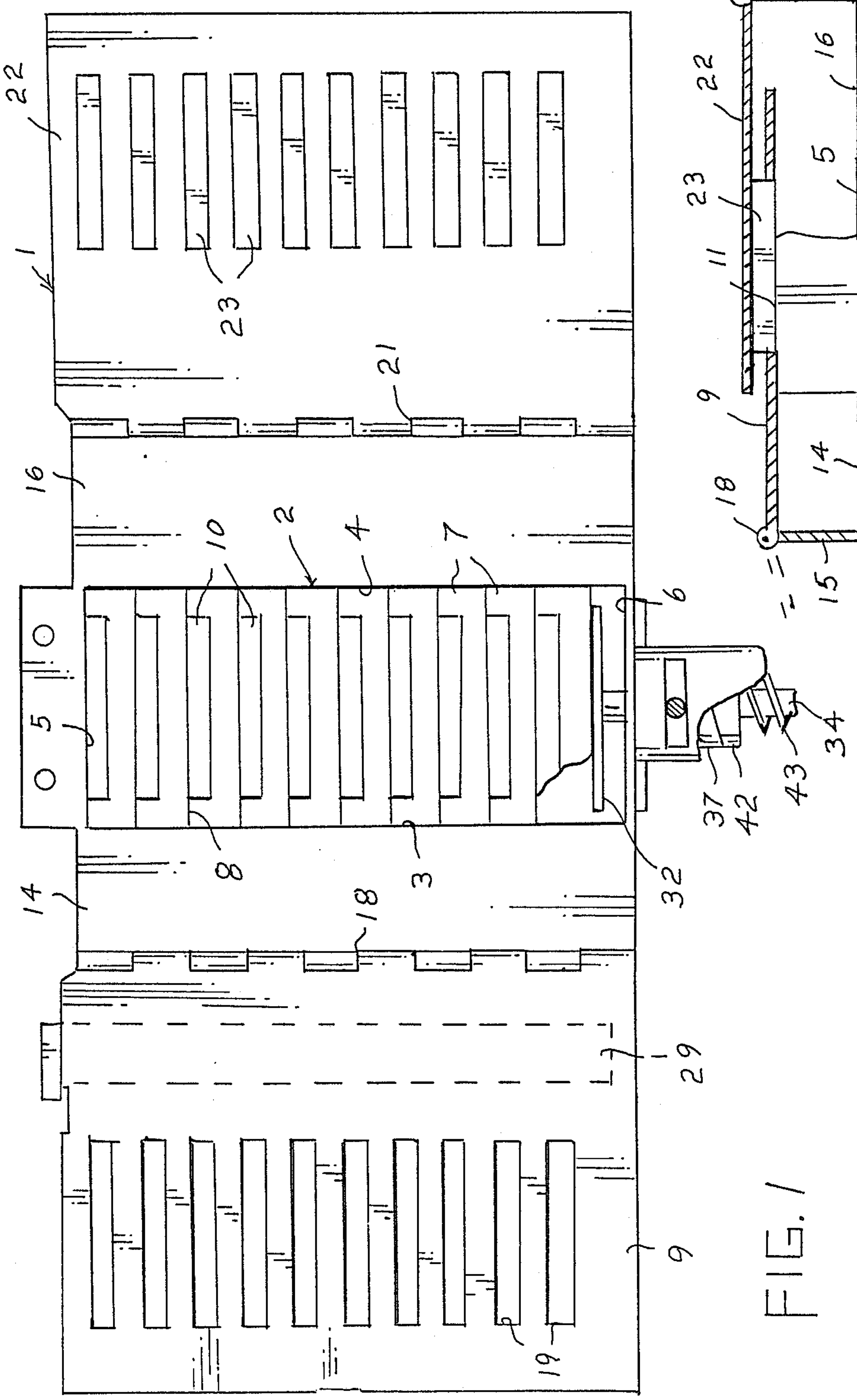
FIG. 1 is a top plan view of an apparatus embodying the invention showing its container loaded with cartridges to be labeled, and showing the stripping and pressure mask plates in the open condition.

The apparatus 1 embodying the invention, as illustrated in the drawing, is a unitary device. It includes a body in the form of a box or rectangular container 2 having elongated side walls 3, 4, and laterally extending relatively narrower front and back walls 5, 6. The container, as indicated in FIG. 1, is designed to have a multiple number of computer cartridges 7 seated therein in side to side relation for purposes of labeling the cartridges. The container shown is adapted to contain ten cartridges. The width of the container compliments the width of the broad side 8 of the cartridge so as to enable a slide fit of the cartridge relative to the side walls of the container; and the length of the container is slightly greater than the overall space occupied by the several cartridges entered into the container. This extra length allows some side play between the cartridges to permit their easy removal from or entry into the container. And the depth of the container is less than the height of the cartridges seated therein. This not only facilitates manual removal of the cartridges, but also enables a stripping mask plate 9, hereinafter described, to be properly seated upon the exposed backs of the cartridges.

To ensure and facilitate a proper seating of the cartridges in the container with their backs 11 facing uppermost, a corner 12 (FIG. 4) along the floor of the container is angled to complement a corner 13 at the bottom of each cartridge.

Extending laterally from the rim of the side wall 3 of the container (FIG. 4) is a horizontal shoulder 14 which terminates at its outer end in a vertical flange 15. A shoulder 16 similarly extends from the opposite side wall 4 of the container and terminates in a vertical flange 17 parallel to flange 15. Hinged at 18 along the upper end of flange 15 is the laterally extending stripping mask plate 9. This plate is adapted to be manually turned on its hinge to position a plurality of laterally extending parallel slots 19 therein over the open top of the container 2. If the cartridges have already been seated in the container, portions of the plate bordering the slots will rest atop the backs of the cartridges; and portions of the backs of the cartridges complementing the slots will be disposed below the slots. The back of the conventional cartridge is indented along one edge 10 for seating a label thereon. It is this indented area which will be disposed below the slot.

Hinged at 21 along the upper end of flange 17 is a pressure mask plate 22. A plurality of laterally extending parallel pads 23, here formed of rubber, are mounted upon the upper surface of the plate and complement the slots in the stripping mask plate. The pressure mask plate is adapted to be manually turned on its hinge to close down upon the stripping mask plate after the latter has been seated upon the backs of the cartridges. In its closing movement, the rubber pads will register with and pass through the slots sufficiently to lightly press upon the backs of the cartridges.

Figure 6:
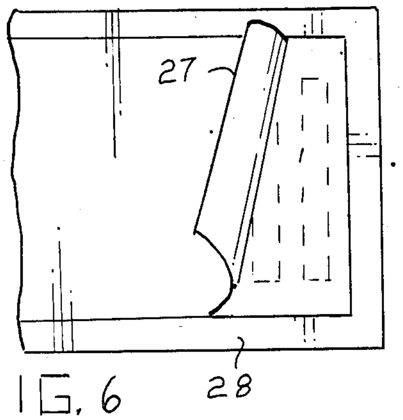
FIG. 6 is a rear view of FIG. 5 showing the backer to the adhesive area of the sheet partially peeled away.
Figure 5:
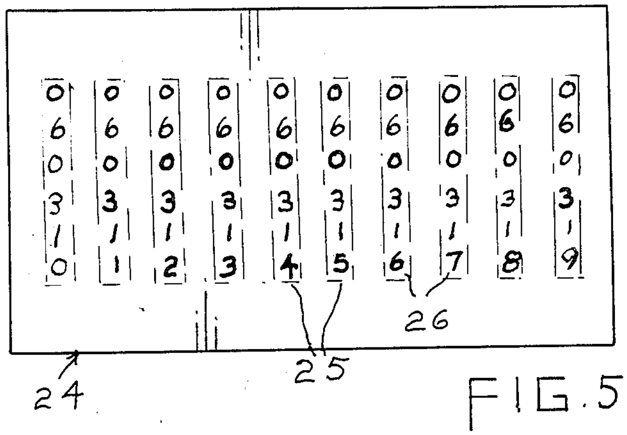
FIG. 5 is a plan view of the sheet of labels, the columns of labels being shown die cut.

As earlier stated herein, the purpose of the apparatus is to apply identifying labels simultaneously to the backs of the several cartridges seated in the container. To this end, a rectangular sheet 24 (FIGS. 5, 6,) is provided. It has a group of uniformly spaced parallel columns 25 of index characters 26 printed on its face. The columns are die cut in the sheet to facilitate their being pressed out of the sheet onto the backs of the cartridges. Here, the characters are shown as single digits. Each column defines a label to be applied to the back of a separate one of the cartridges seated in the container. The rear of the several columns of index characters is coated with an adhesive; and, for convenience in storing and handling the sheet, the adhesive coating is covered by a backer 27, preferably of plastic material. Prior to making use of the sheet, the backer will be peeled off, as indicated in FIG. 6. The marginal area 28 of the rear face of the sheet bordering the backer is free of adhesive.

The sheet is intended to be used after the stripping mask plate 9 has been turned on its hinge and rested upon the backs of the several cartridges seated within the container. The sheet with its backer removed will then be seated face up upon the upper face of the plate. The columns of index characters are spaced from one another in such manner that, upon a proper seating of the sheet upon the plate, each column will register with a separate slot in the plate above one of the cartridges.

Figure 2:
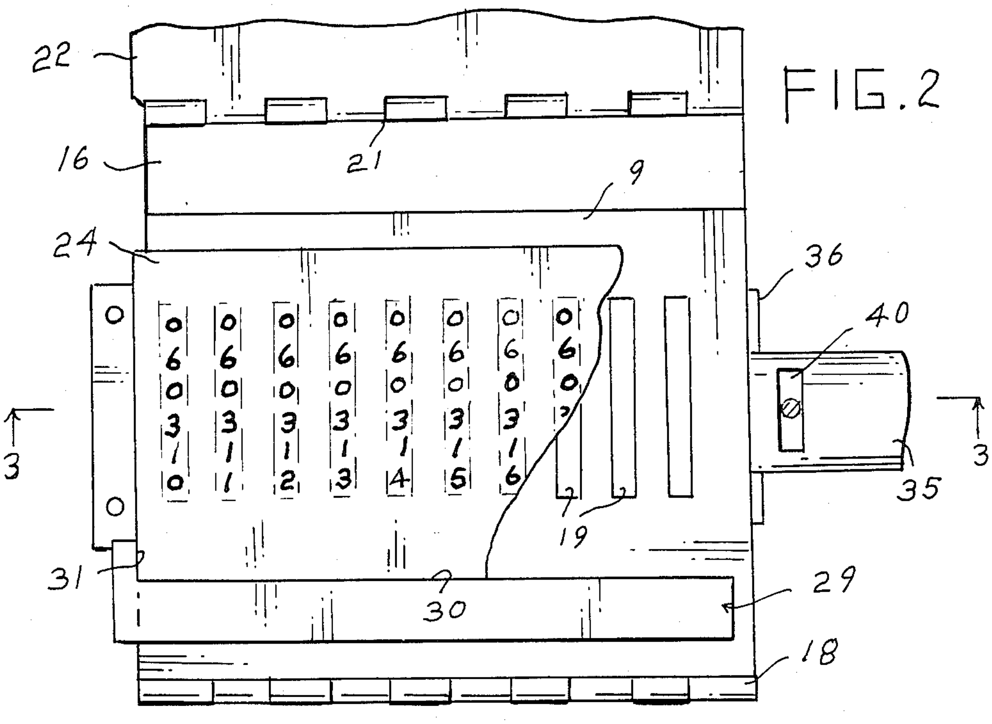
FIG. 2 is a top plan view of the apparatus showing the stripping mask plate closed upon the backs of the cartridges, a sheet containing columns of labels in the form of index characters seated upon the stripping mask plate, and the pressure mask plate in open condition.

To ensure and facilitate a proper positioning of the sheet upon the stripping mask plate, a guide 29 (FIG. 2) is mounted on the outer face of the plate. This guide comprises a longitudinally extending shoulder 30 parallel to the side 3 of the container, and an end shoulder 31 at right sngles to the shoulder 30. When the sheet 24 of index characters is cornered against the guide's shoulders 30, 31, the several columns of index characters on the sheet will be properly registered with the underlying slots of the stripping mask plate.

As earlier mentioned, the container is elongated sufficiently to enable some initial side play between the cartridges to be seated therein so as to facilitate entry into and removal of the cartridges from the container. But, to avoid any undesirable side play of the cartridges during a labeling operation of the apparatus and to ensure a desirable registration of the backs of the cartridges with the slots of the stripping mask plate, pressurizing means is provided to remove the side play between the cartridges before the labeling operation takes place.

This pressurizing means includes a pressure plate 32 disposed between the side face 8 of the rearmost seated cartridge and the back wall 6 of the container. Fixed to the pressure plate and projecting slidably through the back wall of the container is a slide rod 34. This rod extends into a tube 35 fixed by a flanged wall 36 to the back wall of the container. A double cam unit mounted within the tube upon the rod comprises a forward cam element 37 which is rotatable relative to the rod by means of a manipulative lever 38. Cam element 37 has an angled rear cam face complementing a cam face at a forward end of a rear cam element 42 fixed on the rod. A spring 43 loaded between cam 42 and a back wall 44 of the tube constantly tensions cam 42 into abutment with the forward cam 37.

Figure 3:
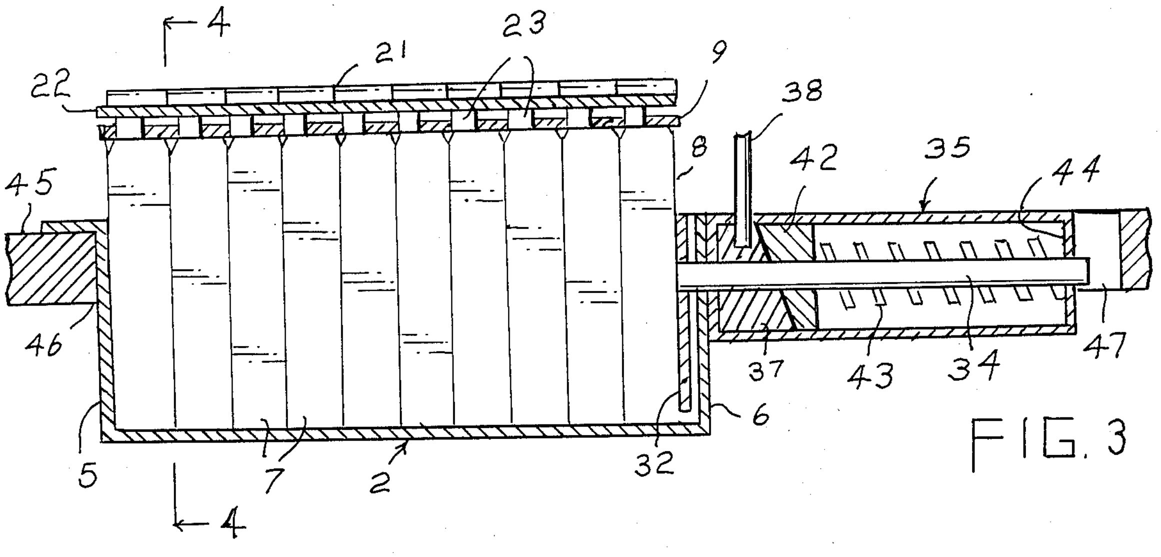
FIG. 3 is a section on line 3—3 of FIG. 2, but showing both the stripping and the pressure mask plates in closed condition and including a table on which the apparatus is mounted.

The cam unit has a normal condition, as in FIGS. 1, 3 in which cam 37 abuts the front wall 36 of the tube, the cam faces are in full contact with each other, and the pressure plate 32 is spaced a short distance forward of the back wall of the container. When the cam lever 38 is manually moved from its normal position to an opposite end of the slot 40, cam 37 forces cam 42 and the rod 34 rearwardly against the load of spring 43 to carry the pressure plate 32 rearwardly of the container. This will provide ample room in the container to facilitate manual entry of a group of cartridges to fill the container. After entry of the cartridges, the cam lever may then be moved back to its normal position, as in FIG. 1. This will cause cam 42, together with the rod to restore forwardly under the load of spring 43 to pressure the cam plate 32 against the group of cartridges. This will restrain the cartridges against any undesirable movement so as to allow a proper application of the columns of index characters to the backs of the cartridges.

In using the invention, following proper seating of the cartridges in the container under pressure of the cam pressure plate 32, closing of the stripping mask plate 9 upon the backs of the cartridges, and proper positioning of the unbacked sheet 24 of index characters upon the stripping mask plate, the pressure mask plate 22 is then turned on its hinge to close down upon the sheet and the underlying stripping mask plate. In this action, the rubber pads on the pressure mask plate press and strip the several columns of index characters simultaneously from the sheet through the slots of the stripping mask plate onto the backs of the cartridges. The adhesive on the underfaces of the several columns of index characters causes them to adhere to the backs of the cartridges. In this action of the pressure mask plate, the edges of the slots in the stripping mask plate cooperate with the downwardly moving pads of the pressure mask plate to strip the several columns of index characters from the sheet. The stripping operation is further facilitated by the existing partial precut condition of the columns of index characters relative to the sheet.

Figure 4:
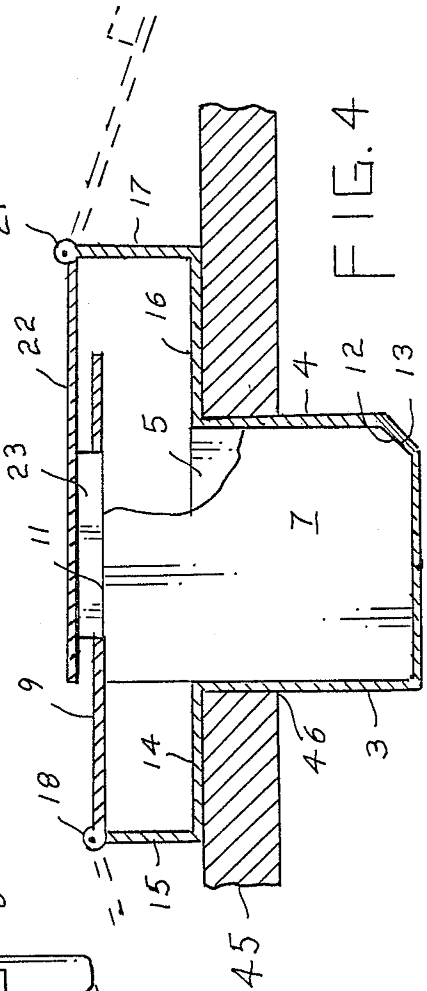
FIG. 4 is a section on line 4—4 of FIG. 3.

As indicated in FIGS. 3 and 4, the apparatus is preferably supported in a table 45. To this end, a suitable opening 46 is provided in the table in which the container may be seated in such manner that its shoulders 14 and 16 will rest upon and may be fastened to the table's surface. A suitable cutout 47 into one end of the table opening may be provided, as indicated in FIG. 3, to accomodate the tube 35 housing the cam elements 37, 42.

FIGS. 7 and 8 disclose a modified form of the means for pressuring the cartridges against one another preparatory to pressing the labels onto the backs of the cartridges. In this form a cartridge pressure plate 49 is fixed to the forward ends of a group of slide rods 50, here four in number, each extending with a slide fit through the rear wall 6 of the container. The pressure plate is loaded by springs 51 partway into the container. Knobs 52 on external ends of the rods cooperate with the rear wall of the container to limit the forward position of the pressure plate into the container. The normal position of the pressure plate in the container under the spring load is such as to require the plate to be forced rearwardly, as indicated in broken line, sufficiently against the load of the springs to enable the last of the cartridges 7 to be entered into the container. To facilitate entry of the last cartridge, the pressure plate has rearwardly sloping upper ends 53 down which the cartridge may be moved to force the pressure plate rearwardly against the load of the springs to allow entry of the cartridge into the cotainer. When the several cartridges have been entered into the container, the pressure plate under the load of the springs will pressure the several cartridges against one another preparatory to application of the labels.

FIGS. 9 and 10 represent a modified form which the pads on the pressure mask plate 22 may take for pressing the columns of labels from the sheet 24 through the slots 19 of the stripping mask plate 9 onto the backs of the cartridges. In this form the rubber pads 23 shown in FIGS. 1 and 4 are replaced by spring loaded pressers or pads 54 of firm material. Each presser 54 is of elongated U-form. It has an elongated flat bottom 55, a vertical arm extending from each of its ends, and a flange 57 extending laterally from the upper end of each arm 56.

Each presser 54 depends with a slide fit in a separate slot 58 formed in the pressure mask plate 22, and is supported it its position by resting of its end flanges 57 upon the pressure mask plate. The several slots 58 are closed over by a capping plate 59 fixed upon the pressure mask plate. Each presser is loaded outwardly of the pressure mask plate by an individual inverted flat V-spring 60. Each flanged portion 57 of the presser is freely movable through a complementary opening 61 in the capping plate upon compression of the presser against the load of its spring.

It can be seen that, as the pressure mask plate 22 is closed down upon the stripping mask plate 9, the pressers in moving through the slots 19 of the stripping mask plate will press the labels onto the backs of the cartridges. In the pressing action the pressers will yield slightly upwardly against the load of their springs 60.

While an embodiment of the invention has been illustrated and described in detail, it is to be expressly understood that the invention is not limited thereto. Various changes can be made in the design and arrangement of the part without departing from the spirit and scope of the invention as the same will now be understood by those skilled in the art; and it is my intent therefore, to claim the invention not only as shown and described, but also in all such forms and modifications thereof as may be reasonably construed to fall within the spirit of the invention and the scope of the appended claims.

What is claimed is:

1. Computer cartridge labeling apparatus comprising an elongated container adapted to have a plurality of cartridges seated therein in side by side relation with their backs uppermost, a label stripping mask plate hingedly mounted at an elongated side of the container adapted upon being turned on its hinge to seat upon and to position a plurality of laterally extending slots therein in register with and above the backs of the cartridges, a sheet having partially precut therein a plurality of laterally extending labels, the sheet being adapted to be seated upon the turned label stripping plate with each of its labels in register with a separate slot, and a pressure mask plate hingedly mounted at an elongated opposite side of the container having on a face thereof a plurality of laterally extending pads each registrable with a separate one of the labels and each adapted upon turning of the pressure mask plate on its hinge to press the registered label through the slot onto the back of a separate one of the cartridges.

2. Computer cartridge labeling apparatus as in claim 1, wherein the pads are rubber.

3. Computer cartridge labeling apparatus as in claim 1, wherein the pads are resilient.

4. Computer cartridge labeling apparatus as in claim 1, wherein manually operable means attached to the container is provided for camming the cartridge into a tight side by side relation after they have been seated in the container.

5. Computer cartridge labeling apparatus as in claim 1, wherein guide means is provided upon the label stripping mask plate as a guide to seating the sheet on the label stripping mask plate in such manner that each label is in register with a separate slot.

6. Computer cartridge labeling apparatus as in claim 1, wherein an elongated shoulder extends laterally from each elongated side of the container, the container is adapted to be located in an opening of a table, and each elongated shoulder is adapted to rest upon the table.

7. Computer cartridge labeling apparatus as in claim 1, wherein manually actuable means attached to the container is provided for pressurizing the cartridges into a tight side by side relation after they have been seated in the container, and guide means is provided upon the label stripping mask plate as a guide to seating the sheet on the label stripping plate in such manner that each label is in register with a separate slot.

8. Computer cartridge labeling apparatus as in claim 7, wherein an elongated shoulder extends laterally from each elongated side of the container, the container is adapted to be located in an opening of a table, and each elongated shoulder is adapted to rest upon the table.

9. Computer cartridge labeling apparatus as in claim 1, wherein means attached to the container is provided for pressuring the cartridges into a tight side by side relation after they have been seated in the container.

10. Apparatus for applying identifying labels simultaneously to the backs of a multiple number of computer cartridges comprising: an elongated rectangular container open at its top for reception of the cartridges, a label stripping mask plate hingedly mounted at an elongated side of the container adapted to be manually turned on its hinge to register a group of slots therein with and above the backs of cartridges seated in the container, the label stripping mask plate being adapted when so turned to have a sheet containing labels partially precut therein seated upon its upper face with each label in register with a separate one of the underlying slots, and a pressure mask plate hingedly mounted at an elongated opposite side of the container having on a face thereof a group of resilient pads adapted upon turning of the pressure mask plate to register with the labels and press them through the underlying slots onto the backs of the cartridges.

11. Apparatus for applying identifying indicia simultaneously to the backs of a multiple number of computer cartridges comprising: an elongated rectangular container open at its top for reception of the cartridges, a label stripping mask plate hingedly mounted at an elongated side of the container adapted to be manually turned on its hinge to position a plurality of laterally extending slots therein above the open top of the container and above the backs of the cartridges seated in the container, a pressure mask plate hingedly mounted at an opposite elongated side of the container having a plurality of laterally extending parallel pads on a face thereof registrable with and slidable through the slots upon manually turning the pressure mask plate on its hinge down upon the label stripping mask plate after the latter has been positioned above the top of the container, the container being adapted to have a multiple number of cartridges seated therein with their backs uppermost, the label stripping mask plate being adapted when turned on its hinge to seat upon the backs of the cartridges and register its slots with complementary portions of the backs of the cartridges, the label stripping mask plate when so turned being adapted to have seated thereon a sheet having a plurality of laterally extending parallel columns of index characters in register with the slots, and the pressure mask plate being adapted when so turned on its hinge to press the columns of index characters from the sheet through the slots and onto the backs of the cartridges.

* * * * *